United States Patent [19]

Gordon et al.

[11] Patent Number: 4,507,411

[45] Date of Patent: Mar. 26, 1985

[54] CROSS-LINKED POLYMER COMPOSITIONS AND PRODUCTION THEREOF

[75] Inventors: Kevin R. Gordon, Laleham-on-Thames; Jeffrey R. Kelsey, Ashford; Ivan C. Stannard, Carshalton, all of England

[73] Assignee: The British Petroleum Company Limited, London, England

[21] Appl. No.: 305,370

[22] Filed: Sep. 24, 1981

[30] Foreign Application Priority Data

Sep. 26, 1980 [GB] United Kingdom ............... 8031233

[51] Int. Cl.³ .............................................. C08L 63/10
[52] U.S. Cl. ................................... 523/436; 428/413; 428/418; 525/65; 525/111.5; 525/117; 525/119; 523/450
[58] Field of Search ................ 525/65, 122, 911, 119, 525/111.5, 530, 533; 428/413, 418; 523/407, 450, 436; 524/313, 86

[56] References Cited

U.S. PATENT DOCUMENTS

| | | | |
|---|---|---|---|
| 3,869,385 | 3/1975 | Stanley et al. | 210/53 |
| 3,926,903 | 12/1975 | Scola | 525/911 |
| 3,926,904 | 12/1975 | Scola | 525/911 |
| 4,016,022 | 4/1977 | Browning et al. | 525/911 |
| 4,028,432 | 6/1977 | Dawans et al. | 525/122 |
| 4,102,942 | 7/1978 | Smith et al. | 428/413 |
| 4,107,116 | 8/1978 | Riew et al. | 525/911 |
| 4,131,715 | 12/1978 | Frankel | 428/413 |

FOREIGN PATENT DOCUMENTS 0023084  1/1981  European Pat. Off. .

OTHER PUBLICATIONS

Lee et al., "*Handbook of Epoxy Resins*", McGraw-Hill Book Co., N.Y.C., 1967, pp. 15-30.

*Primary Examiner*—Allan M. Lieberman
*Attorney, Agent, or Firm*—Morgan, Finnegan, Pine, Foley & Lee

[57] ABSTRACT

A composition suitable for forming surface coatings, laminates or composite materials formed by bringing together:

(a) a first polymer containing carboxylic acid, anhydride or acid chloride groups, (b) an amine or alcohol or a derivative thereof which is a tertiary amine, a ketimine, an acetal or an oxazolidine and (c) a second polymer capable of cross-linking with the first polymer in the presence of the amine or alcohol.

The components may be initially in two packs and either mixed prior to application or sprayed onto the surface simultaneously from separate nozzles.

The surface coatings are particularly suitable for coating surfaces which are otherwise difficult to coat and protect and may be applied to wet or rusted surfaces without surface preparation.

10 Claims, No Drawings

CROSS-LINKED POLYMER COMPOSITIONS AND PRODUCTION THEREOF

This invention relates to a composition suitable for forming a surface coating, a method of forming a surface coating by cross-linking a polymer containing carboxylic acid, anhydride or acid chloride groups and to surface coatings so produced.

It is known that polymers containing carboxylic acid, anhydride or acid chloride groups (e.g. maleinised polybutadiene) can be cross-linked by reacting them with amines or alcohols. For example, our European Patent Application No. 802030 published as European Patent Application No. 0023084 utilises this reaction to encapsulate organic material (e.g. oil) and so provides a technique for cleaning up oil spills. For this use relatively rapid cross-linking is desirable, but for surface coatings the required rate of cross-linking will depend upon the particular application. Further, it may be desirable to include additional polymers to toughen the coating.

However, many conventional polymers used in surface coatings (e.g. epoxy compounds, coal tar resins, polyurethanes and polyesters) do not react directly with polymers containing carboxylic acid, anhydride or acid chloride groups or will only react at above ambient temperatures. It is important, therefore, to select an amine or alcohol cross-linking agent which will not only provide the required rate of cross-linking but which will facilitate interaction between the polymer containing acid, anhydride or acid chloride groups and the other polymer, at ambient temperature.

The present invention is based on the choice of suitable amines and alcohols.

According to the present invention a composition suitable for forming surface coatings, laminates or composite materials is formed by bringing together:
(a) a first polymer containing carboxylic acid, anhydride or acid chloride groups,
(b) an amine or alcohol or a derivative thereof which is a tertiary amine, a ketimine, an acetal or an oxazolidine and
(c) a second polymer capable of cross-linking with the first polymer in the presence of the amine or alcohol.

The present invention includes a method of forming surface coatings comprising applying to a surface the components described above and allowing the components to cross-link to form a surface coating. It also includes surface coatings formed from said components.

For convenience, the polymer containing carboxylic acid, anhydride or acid chloride groups will hereafter be referred to as a "functionalised" polymer and the formation of the carboxylic acid, anhydride or acid chloride groups in the polymer as "functionalisation".

The polymer may be any polymer capable of being functionalised. It is preferably a polyolefin and more particularly a polymer of a mono- or di-olefin containing, before functionalisation, at least one and preferably a plurality of pendant vinyl groups.

The polyolefins may be derived in known manner from conjugated dienes such as butadiene, isoprene and chloroprene and mono-olefins such as isobutene and 4-methylpentene-1.

Suitable polymers may also be obtained from linear mono-olefins such as ethylene and/or propylene; acrylates and methacrylates having sufficiently long chains to give oil solubility; and substituted styrenes such as t-butyl styrene.

Polymers derived from naturally occurring substances may also be used, provided they can be functionalised, e.g. linseed or soya bean oil and natural rubber.

The molecular weight of the polymer may vary widely depending on its type and may range from 250 (e.g. linseed oil) to $1 \times 10^6$ or more (e.g. natural rubber) with intermediate values for synthetic polymers, (e.g. 5,000–20,000 MW for maleinised polybutadiene and 200,000–500,000 for maleinised polyisoprene).

The polymers may be functionalised by the incorporation of carboxylic acid, anhydride or acid chloride groups by known techniques. Convenient methods are maleinistion across double bonds in the polymer or copolymerisation with a reactant containing the required functional groups.

The extent of functionalisation will depend on the number of sites (e.g. double bonds) which can readily be functionalised or, in the case of copolymerisation, the proportion of reactants. The extent of functionalisation may thus vary widely depending on the type of polymer and may range from 1% (e.g. natural rubber) to 50% (e.g. linseed oil). Preferably the extent of functionalisation is from 1 to 15% by weight.

Preferred polymers may thus be maleinised polybutadiene, polyisoprene, EPDM rubber or natural rubber. Maleinised polybutadienes having a molecular weight of from 2,000–20,000 are commercially available, e.g. those sold under the trade name "Lithene" by Revertex Limited.

The functionalised polymer should be in a form suitable for application to a surface by normal means, e.g. spraying or brushing, and may, if necessary, be dissolved or dispersed in a suitable solvent or diluent. Suitable solvents may be hydrocarbon solvents (e.g. naphtha, white spirit, kerosine, toluene, xylene) or other organic solvents (e.g. ketones, ethers or esters). The type and quantity of solvent should be selected to minimise solvent entrapment in the cross-linked surface coating and to be compatible with any additional components present.

The specific amine, alcohol or derivative thereof used will depend on the rate of cross-linking required and the polymers to be cross-linked. They are also preferably used in liquid form, either as such or dissolved or dispersed in a suitable solvent or diluent.

Examples of suitable compounds are:

Tertiary Amines

Tri(dimethylaminomethyl)phenol
Bis(dimethylamino)propan-2-ol
Triethylamine
2-dimethylaminoethanol
$N,N,N^1,N^1$-tetramethylethylenediamine
N-methyldiethanolamine
N,N-dimethyl-1,3-propanediamine
1-dimethylamino-2-propanol

Ketimines

Ketimines prepared from the reaction of:
  Ethylene diamine with acetone, methyl isobutyl ketone, methyl ethyl ketone, methyl amyl ketone or allyl butyl ketone.
  Diethylene triamine with the above ketones.
  Propylene diamine with the above ketones.

A wide variety of polyfunctional amines may be reacted with a wide variety of ketones to produce ketimines. Functional groups other than the keto and amino groups may also be present in the molecule provided that these take no part in the ketimine formation reactions. Thus, groups such as halogens, hydroxyl and other groups may be present.

Acetals

Acetals prepared from the reaction of:
n-hexanol with 2-dimethylaminoethanol
N-ethylaminoethanol
2-aminoethanol A wide variety of amino-ethanols may be reacted with a wide variety of aldehydes to produce acetals. The choice may be limited to less volatile reactants if azeotropic distillation is used to prepare the acetals. As with the ketimines, other inert functional groups may be present in the molecules.

Oxazolidines

Oxazolidines of general formula:

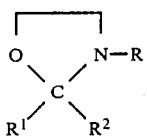

where $R, R^1, R^2$ are alkyl groups. e.g. 2,2-dihydrooxazolidine, 2-isopropyloxazolidine, 2-n-hexyloxazolidine.

The other polymer capable of reacting with the functionalised polymer in the presence of the defined amine, alcohol or derivative thereof may be an epoxy resin or a polyurethane resin. Tertiary amines are specific to epoxy resins and acetals to polyurethanes. Ketimines and oxazolidines will react with both epoxy and polyurethane resins.

Again the other polymer should be in a form suitable for application by spraying or brushing. Examples of suitable epoxy resins are: diglycidalethers of diphenylolpropane. Both high and low molecular weight resins may be used, e.g. the following commercially available resins.

Low Molecular Weight

Araldite GY250 or GY252 marketed by Ciba-Geigy Ltd.
Epikote 815, 828 or 834 marketed by Shell Chemicals Ltd.
DER 321 or 331 marketed by Dow Chemicals Ltd.

High Molecular Weight

Araldite 6100 (Ciba-Geigy Ltd).
Epikote 1001 (Shell Chemicals Ltd.)
DER 660 (Dow Chemicals Ltd.) and examples of suitable polyurethanes are:
(a) the reaction product of water and hexamethylene-diisocyanate marketed by Bayer as Desmodur N
(b) mixtures of diphenylmethane-4,4¹-diisocyanate with homologues marketed by Bayer as Desmodur VL
(c) the reaction product of water and toluene diisocyanate marketed by Bayer as Desmodur L.

The proportions of functionalised polymer, amine, alcohol or derivative thereof and other polymers will depend on the components used and the quality of coating desired.

A composition according to the present invention may have the following proportions based on parts by weight of the total weight.

|  | Parts by weight |
|---|---|
| Functionalised polymer (e.g. maleinised polybutadiene) | 200–450 preferably 200–260 |
| Other polymer (e.g. epoxy resin) | 50–250 preferably 130–200 |
| Cross-linking agent (e.g. tri(dimethylaminomethyl) phenol | 5–220 preferably 12–20 |

The compositions may contain other polymers, resins, extenders, pigments, etc., known to be useful in surface coatings. Examples of such materials include:

| 1. | Pigments and Extenders | |
|---|---|---|
| | Micronised dolomite | Calcium Carbonate |
| | Iron oxides | Talc |
| | Silica | Titanium dioxide |
| | Mica | China clay |
| | Barytes | Sepiolite |
| | Copper (I) oxide | Kieselguhr |
| | Carbon black | Zeolite |
| 2. | Resins | |
| | Coal tar pitch | Bitumen |
| | Coumarone-Indene resins | Vinyl resins |

The compositions may also contain compounds or materials to impart specific properties to the coatings. Such compounds or materials may include:
Surface energy modifiers, e.g. silicone oils
Fire retardants, e.g. triphenylphosphite
Anti-fouling agents, e.g. organo-tin compounds
Anti-corrosive agents, e.g. liquid corrosion inhibitors or ion-exchange resins.

The compositions are preferably prepared in a two-pack form, one pack containing the functionalised polymer and the other the amine, alcohol or derivative. The other polymer is preferably included with the functionalised polymer as is any pigment. The two packs may be mixed prior to application or the components of the two packs may be sprayed on to a surface simultaneously from separate spraying nozzles The components may be mixed by stirring, at moderately elevated temperature if required, (e.g. up to 70° C.). If another resin is used (e.g. coal tar) it is preferably included with the amine, alcohol or derivative.

Although a composition according to the present invention is capable of curing at ambient temperature, to form a surface coating, such a coating may be cured more quickly by heat curing. Surface coatings formed by compositions according to the present invention may be heat cured at temperatures up to 170° C.

The compositions are suitable for the protective coating of any surface, but particularly for coating surfaces that may be otherwise difficult to coat and protect. They may, for example, be used for coating above water surfaces liable to be subjected to spray and humid conditions. Examples of such underwater or above water surfaces are to be found on ships, oil rigs and oil platforms. The compositions may also be suitable for oil tank bottoms and roofs, and may be applied to poorly prepared surfaces.

Although the invention has been described by reference to the use of the compositions for forming surface coatings, the composition of the present invention may also be used to form laminated materials with, for example, glass fibre or may be used in composite materials.

The invention is illustrated by the following examples. In Examples 3 to 12 all the proportions are expressed as parts by weight of the total mixtures.

EXAMPLE 1

A two pack composition was prepared having the following ingredients in percentages by weight:

1st Pack
Solventless 10% maleinised polybutadiene M.W. 8,000: 36%
Solventless low viscosity epoxy resin ep equivalent=190: 16%
Micronised iron oxide: 28%
2nd Pack
Low viscosity solventless coal tar: 17½%
Tri(dimethylaminomethyl)phenol: 2½%

The first pack was prepared by placing the maleinised polybutadiene and epoxy resin in a high-speed disperser vessel and heating to 70° C. to reduce the viscosity. When the viscosity had been reduced sufficiently by heat, the iron oxide pigment was added slowly with slow stirring of the mixture. When the pigment addition was complete the mixture was stirred at high speed to ensure homogeneous wetting of the pigment.

The components of the second pack, being liquids, were simply mixed at ambient temperature.

The compositions of the two packs were mixed and immediately applied to metal plates. The coated plates were then subjected to the tests listed below.

(1) QUV 500 hour accelerated weathering test

A single coat of the mixture was applied to 6 inch×3 inch (152 mm×76 mm) Bondeite 711 aluminum panels. The panels were then exposed alternately to UV radiation and condensation in a repetitive cycle over 500 hours using the apparatus described in ASTM G53-77 (QUV Weatherometer). At the end of the test period the coated panels were assessed for colour change, checking, cracking, rivelling, flowing and adhesion.

(2) ASTM salt spray test

Coatings of known thickness were spread on degreased, polished 6 inch×4 inch (152×102 mm) mild steel panels and cured for 7 days at ambient temperature. Each coated panel was then scored through to the base metal along two diagnonals and subjected to the standard method of salt spray (Fog) Testing ASTM B117-73 at 35° C. Note was made of blistering, lifting and rusting.

(3) Falling ball impact test

Coated plates were subjected to the ASTM-G14.77 Impact Test which comprises dropping a fixed weight through varying heights to produce a point impact on the surface of the specimen. The impact resistance is determined as the amount of energy required to cause penetration of the film.

(4) Conical Mandrel Bend test

After exposure in the QUV Weatherometer as described above (1) the coated panels were subjected to a conical mandrel bend test as described in ASTM D522-60. The coated panel is bent over a conical work piece of known taper. After bending, the surface of the coating is examined for stress lines, cracking or loss of adhesion.

The coating obtained a pass result in each of these tests which indicates that the composition forms a satisfactory coating.

EXAMPLE 2

A two pack composition was prepared having the following ingredients in percentages by weight:

1st Pack
Solventless 10% maleinised polybutadiene M.W. 8000: 30%
Solventless low viscosity epoxy resin ep equivalent=190: 30%
2nd Pack
Low viscosity solventless coal tar: 31%
2,2 dihydrooxazolidine: 9%

The two packs were mixed and immediately applied to a mild steel test plate which was subjected to, and passed, the ASTM B117-73 salt spray test.

EXAMPLE 3

A composition according to the present invention was prepared by mixing the following components:

| Component | Parts by Weight |
| --- | --- |
| Maleinised polybutadiene (MW-8000; MA = 10%) 50% Solution in toluene | 35.2 |
| Epikote 815 | 5.9 |
| Orgol Tar No. 2 | 17.6 |
| DMP-30 | 1.2 |

The maleinised polybutadiene used in this Example was Lithene LX16 sold by Revertex Limited having a molecular weight of approximately 8000 and maleinised to 10% by weight.

Epikote 815 is a low viscosity epoxy resin (9 poise at 25° C.) sold by Shell Chemicals Limited. The resin is based on diglycidal ethers of diphenylolpropane and includes reactive monoepoxides to give the reduced viscosity.

Orgol Tar No. 2 is a solventless coal tar supplied by the British Steel Corporation, having a viscosity of 23 poise at 20° C.

DMP-30 is tris(dimethylaminomethyl)phenol supplied by Anchor Chemicals as Curing Agent K54.

A known thickness (0.5 mm) of the composition was applied to degreased, polished 6 inch×4 inch (152 mm×102 mm) mild steel panels and cured for 7 days at ambient temperature. These panels were then tested to determine the König Pendulum Hardness of the coating using a free pendulum resting on two ball bearings on the coated surface. The time elapsed for the pendulum to swing from 6° to 3° to the vertical was measured and the König Pendulum Hardness calculated with reference to the same pendulum swinging on a glass plate. The König Pendulum Hardness for the above coating was 11.0%.

The composition was also applied with a palette knife to two grit blasted mild steel plates one of which was dry and the other of which was thoroughly wetted with mains tap water. The coatings were allowed to cure for 7 days at 20° C. and were then subjected to a torque test. Metal bolts were fixed to the coating surface with epoxy resin and increasing torque was applied to the bolts until failure of the coating occurred. The average torques for the two panels were 7.73N/mm² for the coating applied to the dry panel and 8.98N/mm² for the coating applied to the wet panel. Although it is accepted that a large number of other variables can also affect adhesion, the results indicate that there is little difference between the adhesion of the coating to wet or dry surfaces.

EXAMPLE 4

Two surface coatings were prepared, each of which comprised:
(a) 10 parts by weight of the same maleinised polybutadiene [MPBD] in toluene as used in Example 3, and
(b) 5 parts by weight of Epikote 815 epoxy resin.

cyanate and is marketed by Bayer. Desmophen A360 is an hydroxylated polyacrylate supplied by Bayer.

The gel time and König Pendulum Hardness for each of the coating compositions was determined.

The gel time was measured using a Tecan Gellation Timer. The test comprises immersing a reciprocating piston in the surface coating composition in a container of known dimensions. When the piston is immobilised by the formation of the cross-linked gel, the time elapsed since the components were mixed is taken as the gel time.

The results which are shown in Table 2 indicate how the choice of the type and amount of cross-linking agent can affect the gel time and hardness of the product.

TABLE 2

| Component | MPBD/Polyurethane Compositions (unpigmented) | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| MPBD(MW-8000; MA = 10%)50% soln in toluene | 10 | 10 | 10 | 10 | 10 | 10 | 10 | 10 | 10 | 10. | 10 | 10 | 10 | 10 |
| Desmodur N 100 | 1.28 | 1.28 | 1.28 | 1.28 | 1.28 | 1.28 | 1.28 | 1.28 | 1.28 | 1.28 | 1.28 | 1.28 | 1.28 | 1.28 |
| Tetramethyldiaminoethane | 0.5 | 0.92 | | | | | | | | | | | | |
| DMP-30 | | | 0.5 | 1.4 | | | | | | | | | | |
| 2-Dimethylaminoethanol | | | | | 0.5 | 1.41 | | | | | | | | |
| Desmophen A360 hydroxylated polyacrylate | | | | | | | 0.5 | 3.43 | | | | | | |
| Bis(dimethylamino)propan-2-ol | | | | | | | | | 0.5 | 1.38 | | | | |
| Tri-2-ethylhexoate of DMP-30 | | | | | | | | | | | 0.5 | 0.66 | | |
| Dimethylaminomethylphenol | | | | | | | | | | | | | 0.5 | 0.76 |
| Gel Time (closed pot), minutes | 4320 | 5760 | 39 | 14 | 4320 | — | 4320 | 1260 | 27 | 18 | 73 | 30 | 16 | 21 |
| Konig Hardness (%) | 14.8 | 14.4 | 11.9 | 7.2 | 3.3 | 5.2 | 11.1 | 11.6 | 7.8 | 5.6 | 13.2 | 16 | 17.3 | 17.2 |

One of the surface coatings had 0.3 parts by weight of DMP-30, tris(dimethylaminomethyl)phenol as the cross-linking agent and the other 0.3 parts by weight of stannous octoate.

A known thickness (0.5 mm) of the coatings were applied to degreased, polished 6 inch×4 inch (152 mm×102 mm) mild steel panels. Some of the panels were allowed to cure at ambient temperature (20° C.) for seven days and some were heat cured at 100° C. for 2 hours followed by 4 hours at 160° C. The König Pendulum Hardness of the coatings was determined for each composition heat cured and ambient cured. The results are shown in Table 1.

TABLE 1

Comparison of the Hardness of Heat Cured and Ambient Cured Coatings

| Component | Ambient Cured | | Heat Cured | |
|---|---|---|---|---|
| MPBD (MW-8000; MA 10%) 50% solution in toluene | 10 | 10 | 10 | 10 |
| Epikote 815 | 5 | 5 | 5 | 5 |
| DMP-30 | 0.3 | — | 0.3 | — |
| Stannous Octoate | — | 0.3 | — | 0.3 |
| Konig Pendulum Hardness (%) | 13.9 | 9.13 | 47.2 | 67.9 |

The results show that heat curing the surface coatings results in harder coatings being obtained much more quickly that when the same coatings are cured at ambient temperature.

EXAMPLE 5

Table 2 shows the components which were mixed to form a number of unpigmented surface coating compositions comprising maleinised polybutadiene [MPBD] and polyurethane with various curing agents. The amounts are parts by weight.

The maleinised polybutadiene used was the same as for Example 3. The polyurethane, Desmodur N 100, is the reaction product of water and hexamethylenediiso-

EXAMPLE 6

Table 3 shows the formulations of a number of pigmented maleinised polybutadiene/epoxy resin/tertiary amine compositions Formulation 6 is a red lead primer according to the present invention.

The maleinised polybutadiene was the same as used for Example 3. NAR 'N' is a non-active resin based on coumarone-indene, supplied by the British Steel Corporation. Cereclor is a chlorinated paraffin sold by ICI. ERL 4221 is 3,4-epoxy cyclohexylmethyl-3,4-epoxycyclohexane carboxylate supplied by Union Carbide. Duomeen TDO is a salt of a fatty acid diamine manufactured by AKZO. Aerosil is a fine silica prepared by flame hydrolysis of silicon tetra chloride and is manufactured by Degussa.

The compositions according to the present invention were prepared by mixing the components except the cross linking agent in a ball mill for 24 hours with part of the solvent and then blending in the remaining solvent and the cross-linking agent.

The formulations were applied to degreased, polished mild stel panels and cured for 7 days at ambient temperature. These panels were then used to determine the König Pendulum Hardness for the coatings and the results are given in Table 3. Formulations 1 to 5 were also applied to (a) polished mild steel panels and (b) mild steel panels to which formulation 6, had been applied and (c) mild steel panels to which a commercial epoxy primer had been applied. The panels were exposed in the ASTM B117-73 salt spray test for 150 hours. Those coatings containing coal tar had the better performance in these tests particularly when the composition according to the present invention was applied over either the commercial epoxy primer or formulation 6.

Formulation 7 was applied to a rusted mild steel surface and then immersed for 720 hours in a mixture of crude oil and sea water. At the end of that time, the coating showed no loss of adhesion. The swelling resistance of formulation 7 was measured using the Rapra Hampden Swell Test. The average shrinkage was found to be 1.6% in oil and 1.2% in water. These results indicate that formulation 7 would form a good coating for use in situations where the coating is likely to come into contact with oil and water.

TABLE 3

| MPBD/Epoxy/Tertiary Amine Compositions (pigmented) | | | | | | | |
|---|---|---|---|---|---|---|---|
| Component | 1 | 2 | 3 | 4 | 5 | 6 | 7 |
| MPBD (MW-8000; MA = 10%) | 17.6 | 17.6 | 17.6 | 17.6 | 17.6 | 97.5 | 23.2 |
| Epikote 815 epoxy resin | 5.9 | 5.9 | 5.9 | 5.9 | — | 75 | 17.8 |
| ERL 4221 epoxy resin | — | — | — | — | 5.9 | — | — |
| Orgol Tar No. 2 | 17.6 | — | — | — | 17.6 | — | 53.5 |
| Pine Oil | — | 17.6 | — | — | — | — | — |
| NAR 'N' hydrocarbon resin | — | — | 17.6 | — | — | — | — |
| Cereclor S52 chlorinated paraffin | — | — | — | 17.6 | — | — | — |
| Barytes | 23.5 | 23.5 | 23.5 | 23.5 | 23.5 | 262.5 | — |
| Micaceous Iron Oxide | 17.6 | 17.6 | 17.6 | 17.6 | 17.6 | — | — |
| Carbon Black | — | — | — | — | — | — | 10.0 |
| Red Lead | — | — | — | — | — | 285 | — |
| Aerosil (10% gel) | — | — | — | — | — | 3.0 | — |
| DMP-30 | 1.2 | 1.2 | 1.2 | 1.2 | 1.2 | 22.5 | 5.4 |
| Duomeen TDO surfactant | — | — | — | — | — | — | 0.5 |
| Solvent (Xylene/ethylethoxyacetate 2:1) | 26.6 | 17.6 | 17.6 | 17.6 | 26.6 | 52.5 | — |
| Konig Hardness (%) | 14 | 22 | 13.6 | 14 | 10.8 | 35.8 | 14.0 |

EXAMPLE 7

Table 4 shows the formulations of a number of maleinised polybutadiene (MPBD)/epoxy resin/ketimine compositions. All amounts are parts by weight.

The gel time and König Pendulum Hardness of the formulations were determined and the results are also given in Table 4. The compositions were also subjected to the ASTM B117-73 salt spray test and the QUV 500 hour accelerated weathering test. All of the formulations gained a pass result in these tests.

TABLE 4

| MPBD/Epoxy/Ketimine Compositions (unpigmented) | | | | | | | | | | | | |
|---|---|---|---|---|---|---|---|---|---|---|---|---|
| Component | 1 | 2 | 3 | 4 | 5 | 6 | 7 | 8 | 9 | 10 | 11 | 12 |
| MPBD(MW-8000; MA = 10%)50% soln. in toluene | 13.3 | 13.3 | 13.3 | 13.3 | 13.3 | 13.3 | 13.3 | 13.3 | 13.3 | 13.3 | 13.3 | 13.3 |
| Epikote 815 epoxy resin | 3.3 | 6.7 | 3.3 | 6.7 | 3.3 | 6.7 | 3.3 | 6.7 | 3.3 | 6.7 | 3.3 | 6.7 |
| (Ethylene diamine/methyl iso-amyl ketone) ketimine | 0.27 | 0.27 | — | — | 0.98 | 0.98 | 0.22 | 0.2 | — | — | — | — |
| (Isophorone diamine/methyl iso-amyl ketone) ketimine | — | — | 0.27 | 0.27 | — | — | — | — | 1.36 | 1.36 | 0.59 | 0.59 |
| Gel time (closed pot), minutes | 4813 | 4800 | 6530 | 4965 | 924 | 435 | 6660 | 7436 | 988 | 892 | 2475 | 2200 |
| Konig Hardness (%) | 9.6 | 8.3 | 7.9 | 9.6 | 10 | 7.5 | 8.8 | 10 | 7.9 | 7.5 | 6.7 | 7.5 |

EXAMPLE 8

Three compositions were prepared comprising maleinised polybutadiene, epoxy resin and a commercially available ketimine, Epikure H3 sold by Shell Chemicals. The relative proportions of the components are given in Table 5 in parts by weight. The maleinised polybutadiene was Lithene LX16 having a molecular weight of approximately 8000 and maleinised to 5%, 10% and 20% respectively for the three compositions.

The gel time for each of the compositions was determined and the results are also given in Table 5. The formulations all gelled very rapidly. Such compositions would be suitable for use as coatings in situations in which the coating had to be applied and cured rapidly. The coatings could be applied using, for example, a dual component external mix spray unit.

TABLE 5

| MPBD/Epoxy Resin/Ketimine Compositions (unpigmented) With Different levels of Maleinisation of the MPBD | | | |
|---|---|---|---|
| Component | 1 | 2 | 3 |
| MPBD (MW-8000; MA = 5%) 50% soln in toluene | 10 | — | — |
| MPBD (MW-8000; MA = 10%) 50% soln in toluene | — | 10 | — |
| MPBD (MW-8000; MA = 20%) 50% soln in toluene | — | — | 10 |
| Epikote 815 epoxy resin | 5 | 5 | 5 |
| Epikure H3 | 2.76 | 2.88 | 3.12 |
| Gel time (open pot), minute | 0.75 | 0.25 | 0.08 |

EXAMPLE 9

Table 6 shows the components in parts by weight which were mixed to form four compositions in which the cross-linking agent is an oxazolidine/acrylic compound supplied by Rohm and Haas under the trade name Acryloid AU-568.

The maleinised polybutadiene (MPBD) was Lithene LX16 maleinised to 5%, 10% and 20% by weight. Formulations 1,2 and 3 contained Epikote 815 epoxy resin while formulation 4 contained Desmodur N, polyurethane.

The gel time for each of the compositions was measured and is reported in Table 6. The formulations were all low viscosity liquids which were easy to apply to steel and aluminium.

Formulation 4 had a much longer gel time and produced a soft rubbery coating.

TABLE 6

| Compositions Containing an Oxazolidine/Acrylic Compound as the Curing Agent | | | | |
|---|---|---|---|---|
| Component | 1 | 2 | 3 | 4 |
| MPBD (MW-8000; MA = 5%) 50% | 10 | — | — | — |

TABLE 6-continued

Compositions Containing an Oxazolidine/Acrylic Compound as the Curing Agent

| Component | 1 | 2 | 3 | 4 |
|---|---|---|---|---|
| soln in toluene | | | | |
| MPBD (MW-8000; MA = 10%) 50% soln in toluene | — | 10 | — | 10 |
| MPBD (MW-8000; MA = 20%) 50% soln in toluene | — | — | 10 | — |
| Epikote 815 epoxy resin | 5 | 5 | 5 | — |
| Acryloid AU-568 oxazolidine/acrylic | 8.21 | 8.96 | 10.47 | 2.57 |
| Desmodur N | — | — | — | 1.28 |
| Gel time (open pot), minutes | 53 | 45 | 16 | 90 |

EXAMPLE 10

Table 7 shows the components in parts by weight which were mixed to give compositions in which the cross-linking agent was oxazolidine. The maleinised polybutadiene (MPBD) was the same as used in Example 3 and the other polymer was Epikote 815 epoxy resin. The gel time and König Pendulum Hardness of each coating were determined and the results are also shown in Table 7.

All the formulations gave tough coatings on curing. Formulation 4 was subjected to the ASTM salt spray test for 456 hours and performed well. The QUV 500 hour accelerated weathering test was carried out on samples of each of the coatings. All the formulations passed the test with only slight yellowing.

TABLE 7

Compositions Containing Oxazolidine as Cross-Linking Agent

| Component | 1 | 2 | 3 | 4 | 5 | 6 |
|---|---|---|---|---|---|---|
| MPBW(MW-8000 MA = 10% 50% soln in toluene | 13.3 | 13.3 | 13.3 | 13.3 | 13.3 | 13.3 |
| Epikote 815 epoxy resin | 3.3 | 6.7 | 3.3 | 6.7 | 3.3 | 6.7 |
| Oxazolidine $CH_2CH_2OCH_2NC_2H_5$ | 0.6 | 0.6 | 0.68 | 0.68 | 0.27 | 0.27 |
| Gel time (open pot), minutes | 600 | 550 | 660 | 820 | 780 | 720 |
| Konig Hardness (%) | 8.3 | 8.75 | 10 | 8.3 | 9.6 | 7.5 |

EXAMPLE 11

Table 8 shows the components in parts by weight which were mixed to give maleinised polybutadiene/epoxy resin/tertiary amine compositions which include other polymers, resins, extenders, pigments or fillers.

Enerflex 72 is a hydrocarbon resin supplied by BP Chemicals Limited.

NAR 'N' is a non-active resin based on coumarone-indene supplied by the British Steel Corporation.

Fillite is pulverised fuel ash and Microspheres MX are hollow glass spheres.

Formulations 1 to 6 formed soft composite coatings with formulation 3 being flexible. Formulations 7 and 8 gave tough composite coatings.

TABLE 8

MPBD/Epoxy Resin/Tertiary Amine Compositions Containing Additional Polymers, Resins, Extenders, Fillers or Pigments

| Formulation | 1 | 2 | 3 | 4 | 5 | 6 | 7 | 8 |
|---|---|---|---|---|---|---|---|---|
| Component | | | | | | | | |
| MPBD(MW-8000; MA = 10%) | 5 | 5 | 5 | 5 | 5 | 5 | 5 | 60 |
| Epikote 815 | 2.5 | 2.5 | 2.5 | 2.5 | 2.5 | 2.5 | 7.5 | 30 |

TABLE 8-continued

MPBD/Epoxy Resin/Tertiary Amine Compositions Containing Additional Polymers, Resins, Extenders, Fillers or Pigments

| Formulation | 1 | 2 | 3 | 4 | 5 | 6 | 7 | 8 |
|---|---|---|---|---|---|---|---|---|
| DMP-30 | 0.8 | 0.8 | 0.8 | 0.8 | 0.8 | 0.8 | 2.4 | 16 |
| Orgol Tar No. 2 | — | — | — | — | — | — | 7.5 | — |
| Enerflex 72 | — | — | — | — | — | — | 7.2 | — |
| Perlite | — | 2.5 | — | — | — | — | 12.5 | — |
| Glass flake | 2.5 | — | — | — | — | — | — | — |
| Rubber Crumb | — | — | 2.5 | — | — | — | — | — |
| Coir Dust | — | — | — | 1.5 | — | — | — | — |
| Fillite | — | — | — | — | 2.5 | — | — | — |
| Micronised Mica | — | — | — | — | — | 2.5 | — | — |
| NAR 'N' | 5 | 5 | 5 | 5 | 5 | 5 | — | 30 |
| Microspheres MX | — | — | — | — | — | — | — | 25 |

EXAMPLE 12

Table 9 shows the components in parts by weight which were mixed to give compositions according to the present invention which were used to form laminated compositions with 'E' glass fibre mat as the reinforcement.

Epodil L is a liquid hydrocarbon resin sold by Anchor Chemicals.

AR5L 'N' is an active resin based on Coumarone-indene supplied by the British Steel Corporation.

The components of each formulation were thoroughly mixed and a portion poured into a PTFE mould. A single layer of 6 inch × 2 inch (152 mm × 51 mm) 'E' glass fibre mat was then placed in the mould and stippled until fully wetted. The mould was filled to the required level with more of the composition and the mould closed. After 16 hours at ambient temperature and pressure the laminated material was removed from the mould.

Only in those samples which had contained solvent was there any shrinkage. Formulation 1 was somewhat brittle whereas formulation 2 formed a soft flexible laminate. Formulations 3 to 7 all formed tough laminated materials.

TABLE 9

MPBD/Epoxy Resin/Tertiary Amine Compositions Used to Form Laminated Materials with 'E' Glass Fibre Mat

| Component | Formulation | | | | | | |
|---|---|---|---|---|---|---|---|
| | 1 | 2 | 3 | 4 | 5 | 6 | 7 |
| MPBD (MW-8000; MA = 10%) | 15 | 15 | 20 | 20 | 20 | 20 | 20 |
| Epikote 828XA | 15 | — | 10 | 10 | 10 | 10 | — |
| Epikote 815 | — | 7.5 | — | — | — | — | 10 |
| DMP-30 | 7.2 | 4.8 | 3.2 | 3.2 | 3.2 | 3.2 | 3.2 |
| Epodil L | 15 | 15 | — | — | — | — | — |
| NAR 'N' | — | — | 20 | — | — | — | — |
| AR5L 'N' | — | — | — | — | — | 20 | — |
| Orgol Tar No. 2 | — | — | — | 20 | — | — | 10 |
| Enerflex 72 | — | — | — | — | 20 | — | 10 |
| Bitumen | — | — | — | — | — | — | — |

We claim:
1. A composition suitable for forming surface coatings, laminates or composite materials formed by bringing together the following components in parts by weight of the total weight;
   (a) 200 to 450 parts of a first polymer containing carboxylic acid or anhydride groups, the extent of functionalization being from 1 to 50% by weight of the first polymer, said polymer being selected from the group consisting of a maleinized homopolymer or copolymer of a polydiolefin, maleinized natural rubber, maleinized linseed oil, maleinized soya bean oil and hydrolyzed derivatives thereof,
(b) 5 to 220 parts of a compound selected from the group consisting of a teritary amine, a ketimine and an oxazolidine and,
(c) 50 to 250 parts of a second polymer which is an epoxy resin capable of cross-linking with the first polymer at ambient temperature in the presence of the tertiary amine, ketimine or oxazolidine.

2. A composition as claimed in claim 1 in which the first polymer is a polymer or copolymer of a diolefin selected from the group consisting of butadiene, isoprene and chloroprene.

3. A composition as claimed in claim 1 in which the first polymer is selected from the group consisting of maleinized polybutadiene, maleinized polyisoprene, maleinized EPDM rubber and maleinized natural rubber.

4. A composition as claimed in claim 1 which comprises the following proportions of the components based on parts by weight of the total weight,
(a) First polymer 200 to 260 parts.
(b) Tertiary amine, ketimeine or oxazolidine 12 to 20 parts.
(c) Second polymer 130 to 200 parts.

5. A composition as claimed in claim 1 in which the extent of functionalization of the first polymer is from 1 to 15% by weight.

6. A method of forming a surface coating comprising applying to a surface the following components in parts by eight of the total weight;
(a) 200 to 450 parts of a first polymer containing carboxylic acid or anhydride groups, the extent of functionalization being from 1 to 50% by weight of the first polymer, said polymer being selected from the group consisting of a maleinized homopolymer or copolymer of a polydiolefin, maleinized natural rubber, maleinized linseed oil, maleinized soya bean oil and hydrolyzed derivatives thereof.
(b) 5 to 220 parts of a tertiary amine, a ketimine or an oxazolidine and,
(c) 50 to 250 parts of a second polymer which is an epoxy resin capable of cross-linking with the first polymer at ambient temperature in the presence of the tertiary amine, ketimine or oxazolidine.

7. A surface coating formed by the method claimed in claim 6.

8. A method as claimed in claim 6 wherein the surface coating is cured at ambient temperature.

9. A surface coating formed by the method claimed in claim 8.

10. A composition as claimed in claim 1 which contains in addition a coal tar.

* * * * *